(12) United States Patent
Pyhälammi

(10) Patent No.: US 6,934,535 B2
(45) Date of Patent: Aug. 23, 2005

(54) PRIVACY PROTECTION IN A SERVER

(75) Inventor: Seppo Pyhälammi, Helsinki (FI)

(73) Assignee: Nokia Corporation (FI)

( * ) Notice: Subject to any disclaimer, the term of this patent is extended or adjusted under 35 U.S.C. 154(b) by 427 days.

(21) Appl. No.: 10/307,410

(22) Filed: Dec. 2, 2002

(65) Prior Publication Data

US 2004/0192268 A1 Sep. 30, 2004

(51) Int. Cl.$^7$ ................................................ H01S 4/00
(52) U.S. Cl. ................ 455/415; 455/412.1; 455/414.3
(58) Field of Search ................................. 455/410, 411, 455/412.1, 414.1, 413.1

(56) References Cited

U.S. PATENT DOCUMENTS

| | | | |
|---|---|---|---|
| 5,038,401 A | | 8/1991 | Inotsume |
| 5,946,444 A | | 8/1999 | Evans et al. |
| 6,311,057 B1 | * | 10/2001 | Barvesten .................... 455/415 |
| 6,424,829 B1 | * | 7/2002 | Kraft ........................ 455/412.1 |
| 6,437,836 B1 | | 8/2002 | Huang et al. |
| 6,493,548 B1 | * | 12/2002 | Kinoshita ................. 455/412.1 |
| 6,633,756 B1 | * | 10/2003 | Tett ........................... 455/412.1 |
| 6,671,262 B1 | | 12/2003 | Kung et al. |
| 6,678,265 B1 | | 1/2004 | Kung et al. |
| 6,751,562 B1 | | 6/2004 | Blackett et al. |
| 6,799,034 B2 | * | 9/2004 | Higuchi et al. ............ 455/414.4 |
| 2002/0137497 A1 | * | 9/2002 | Gillespie ..................... 455/415 |
| 2003/0081145 A1 | | 5/2003 | Seaman et al. |
| 2004/0077337 A1 | * | 4/2004 | Vestergaard et al. ...... 455/414.1 |

FOREIGN PATENT DOCUMENTS

| | | |
|---|---|---|
| EP | 0115038 | 8/1984 |
| EP | 1107209 A1 | 6/2001 |
| GB | 2379116 | 2/2003 |
| WO | WO 02/085004 A1 | 10/2002 |
| WO | WO-03/047172 | 6/2003 |

* cited by examiner

*Primary Examiner*—Creighton Smith
(74) *Attorney, Agent, or Firm*—Banner Witcoff, Ltd.

(57) ABSTRACT

A resource controller may store a plurality of files or other data that are at least partially accessible by one or more users in a network. The user may operate a mobile device, such as a cellular telephone and/or personal digital assistant, to call or otherwise contact the resource controller. The mobile device and/or a communications network may send identification information to the resource controller that identifies the mobile device and distinguishes it from other mobile devices. Based on the identification information, the resource controller may grant or deny access to files. The resource controller may further provide the user with the appropriate user ID and/or password based on the identification information. The user may then enter the user ID and/or password to gain access to files stored at the resource controller.

21 Claims, 6 Drawing Sheets

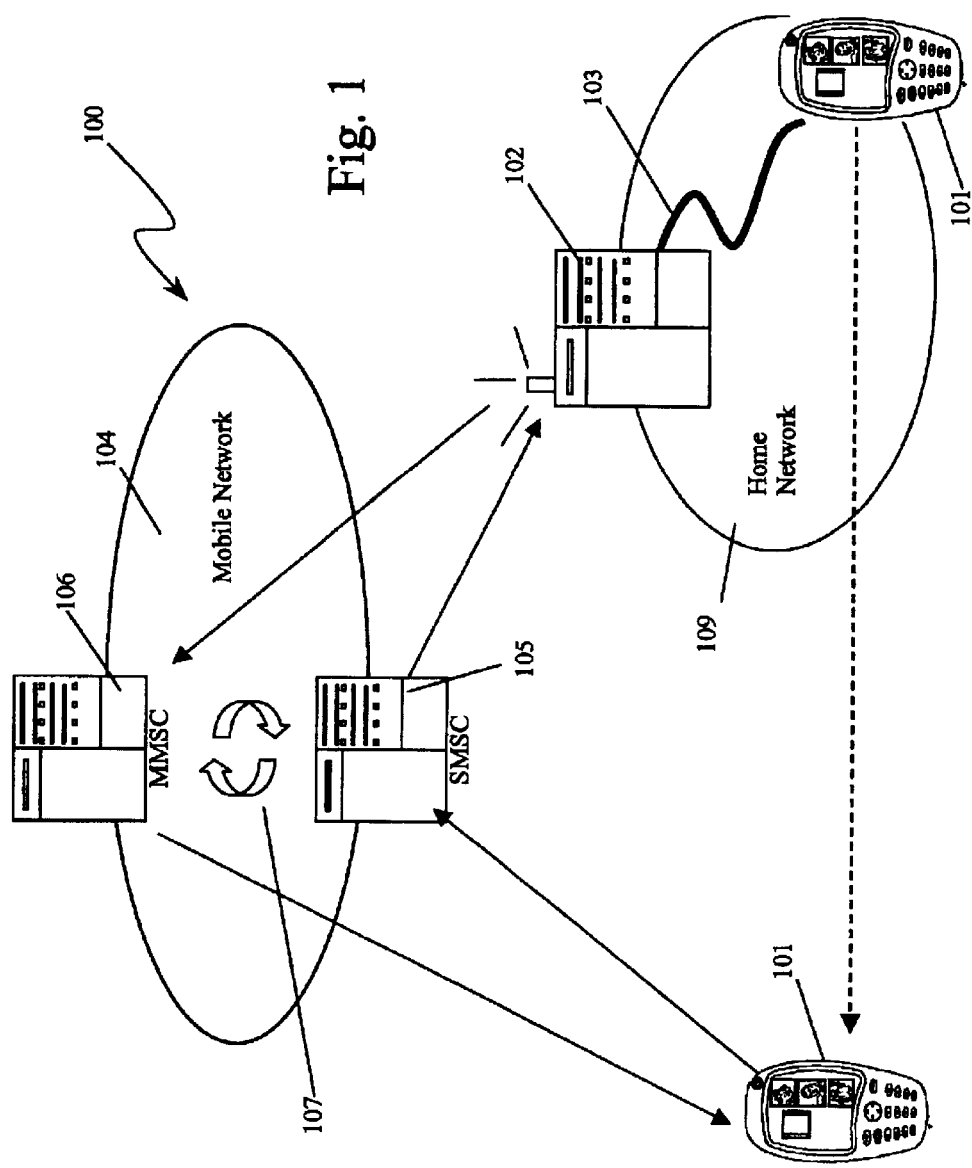

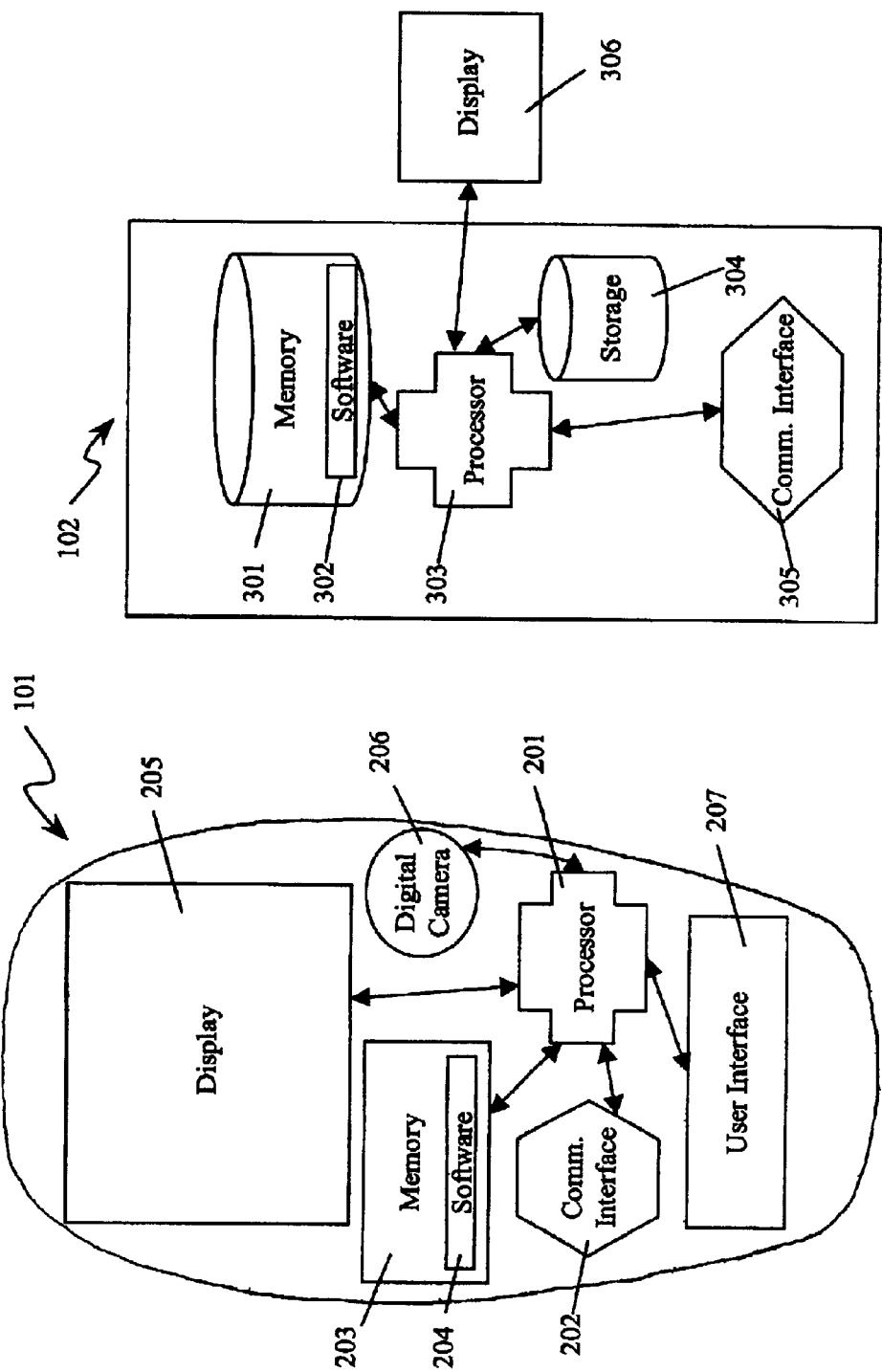

PRIVACY PROTECTION IN A SERVER

FIELD OF THE INVENTION

The present invention relates generally to servers and conditional access to files stored therein. More particularly, the invention concerns systems and methods for protecting the privacy of files in a server and providing for limited access of such files.

BACKGROUND OF THE INVENTION

A variety of mobile computing devices exist, such as personal digital assistants (PDAs), mobile phones, digital cameras, digital players, mobile terminal, and the like, which can perform various functions specific to the device. As the complexity of these mobile devices increases, it is becoming more desirable to provide communication between these devices and with other devices. The trend is for mobile devices to have combined functionality such that a single mobile device may, for example, provide Internet access, maintain a personal calendar, provide mobile telephony, and take digital photographs. Memory size, however, is typically limited on mobile devices and may become increasingly scarce as their functionality expands. One approach to managing memory constraints on mobile devices is to transfer files to another devices, such as a personal computer or dedicated storage equipment.

A user ID and password may be used to secure files stored on the personal computer or dedicated storage equipment such that only certain users may access certain files using a mobile device. However, a problem may arise where the user has forgotten his or her user ID or password. This can be especially problematic in a family server network environment that serves a plurality of accounts for each of a number of mobile users, none of whom have full administrative access to the server. In such an environment, there has been no secure way of allowing a user who has forgotten his or her user ID or password access to secure files. Nor has there been provided a secure way of allowing such a user the ability to determine or change his or her user ID or password without providing the existing user ID and password.

SUMMARY OF THE INVENTION

Aspects of the present invention are directed to allowing a user to remotely access secured files even though the user may not be able to provide a correct user ID and/or password. For instance, the user may have forgotten his or her password. A resource controller, such as a server or other computer, may store a plurality of files or other data that are at least partially accessible by one or more users in a network. The user may operate a mobile device, such as a cellular telephone and/or personal digital assistant, to call or otherwise contact the resource controller. The mobile device and/or a communications network may send identification information over a first communication link to the resource controller that identifies the mobile device and distinguishes it from other mobile devices. For example, the mobile device may cause a cellular communications provider to send caller ID information to the resource controller. Based on the identification information, the resource controller may grant or deny access to files over a second communication link. Access may be full or partial and may vary depending upon the user and/or the particular files being requested. In addition or alternatively, the resource controller may provide the user with the appropriate user ID and/or password based on the identification information. The user may then enter the user ID and/or password to gain access to files stored at the resource controller. Once access is granted, the user may browse through files stored at the resource controller, delete such files, add new files, read such files, and/or modify such files.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 1 is a functional block diagram of an illustrative embodiment of a mobile communications environment in accordance with at least one aspect of the present invention.

FIG. 2 is a functional block diagram of an illustrative embodiment of a mobile device in accordance with at least one aspect of the present invention.

FIG. 3 is a functional block diagram of an illustrative embodiment of a computer in accordance with at least one aspect of the present invention.

DETAILED DESCRIPTION OF ILLUSTRATIVE EMBODIMENTS

Figure 4:
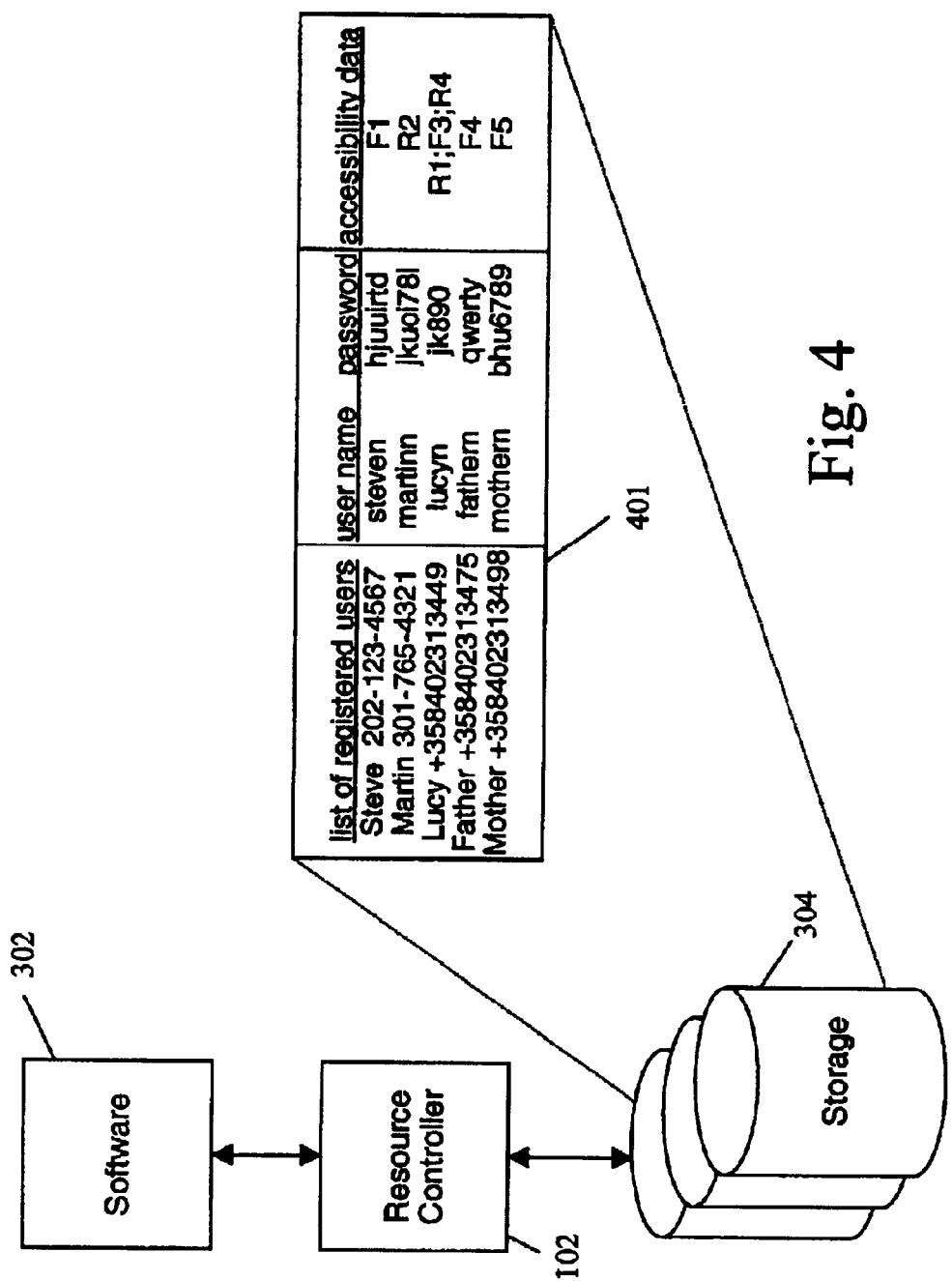
FIG. 4 is another functional block diagram of the mobile communications environment of FIG. 1.

In the following description of various illustrative embodiments, reference is made to the accompanying drawings that form a part thereof, and in which is shown by way of illustration various embodiments in which the invention may be practiced. It is to be understood that other embodiments may be utilized and structural and functional modifications may be made without departing from the scope of the present invention.

FIG. 1 shows an illustrative wireless communication system 100 that supports file browsing and/or transfer. One or more network-enabled mobile devices 101, such as a personal digital assistant (PDA), digital camera, cellular phone, mobile terminal, or combinations thereof, may be coupled to a resource controller 102. The resource controller 102 may act as a server for a network such as a home network 109, and may be a personal computer, a mainframe, a television set-top box, and/or the like. The mobile device 101 may be coupled wirelessly or by wire to the resource controller 102 via, e.g., a wired connection such as a universal serial bus (USB) cable 103, a short-range wireless connection (e.g. BLUETOOTH), and/or other type of connection. As such, the mobile device 101 may transfer files to and/or from the resource controller 102. The resource controller 102 may further act as a repository for storing files related to mobile device 101. In addition, the resource controller 102 may have, or be coupled to, a wireless interface configured to transmit and/or receive communications (such as messages, files, or other data) with a mobile network 104, such as a third-generation (3G) cellular data communications network, a Global System for Mobile communications network (GSM), or any other mobile network.

The mobile device 101 may also have a wireless interface configured to send and/or receive digital wireless communications within the mobile network 104. As part of the mobile network 104, one or more base stations (not shown) may support digital communications with the mobile device 101 while the mobile device is located within the administrative domain of the mobile network 104. The base station of the mobile network 104 that is in communication with the mobile device 101 may be the same or a different base station that is in communication with the resource controller 102. For simplicity, the resource controller 102 and the mobile device 101 are illustratively shown in communication with the same wireless communications network 104; however, a plurality of networks may be utilized within the communication paths between the mobile device 101 and the resource controller 102, including one or more wired networks and/or wireless networks (e.g. cellular, WLAN, BLUETOOTH). Also, the mobile network 104 may itself include one or more wired and/or wireless sub-networks.

The mobile device 101 may communicate with the resource controller 102 via the mobile network 104 and may therefore be configured to remotely store data (such as files) on the resource controller 102 and/or remotely access data already stored on the resource controller 102. Such communication may provide certain advantages. For example, allowing remote access to files may preserve memory resources of the mobile device 101. According to an illustrative embodiment, file transfers between the mobile device 101 and the resource controller 102 may occur via Short Message Service (SMS) messages and/or Multimedia Messaging Service (MMS) messages via a short message service center (SMSC) 105 and/or a multimedia messaging service center (MMSC) 106. Although shown as part of network 104, the SMSC 105 and the MMSC 106 may be part of another network or otherwise outside of network 104.

Although shown as separate logical entities, it is understood that the SMSC 105 and the MMSC 106 may be a single entity. Further, the SMSC 105 and the MMSC 106 may coordinate via signaling 107 between themselves for improving the file transfer process. For example, because the SMSC 105 and MMSC 106 may be store-and-forward forward systems, rather than real-time systems, a file requested via an SMS message from the mobile device 101 may still reside on the MMSC 106 based upon a previous request. As such, the SMSC 105 may copy the MMSC 106 on an SMS file request and, if applicable, the MMSC 106 may notify the user of the previously stored file. Further, the MMSC 106 may simply transfer the requested file based on its stored copy of the file. In other embodiments, the MMSC 106 may act as a repository for files, and the mobile device 101 may simply request transfer of files from the MMSC 106.

As shown in FIG. 2, the illustrative mobile device 101 may include a processor 201 connected to a user interface 207, a communications interface 202 (which may be wireless), memory 203 and/or other storage, a display 205, and/or a digital camera 206. The user interface 207 may include a keypad, touch screen, voice interface, or the like. Software 204 may be stored within the memory 203 and/or other storage that provides instructions to the processor 201 for enabling the mobile device 101 to perform various functions. For example, the software 204 may configure the processor 201 to enable the mobile device 101 to take digital photographs via the digital camera 206, to save those photographs as image files on the resource controller 102, to retrieve and display image files from the resource controller 102, and to browse the Internet using the communications interface 202. The communications interface 202 may, in an illustrative embodiment, include two or more wired and/or wireless interfaces each configured to communicate over a different communication link.

As shown in FIG. 3, the illustrative resource controller 102 may include a processor 303 coupled to a communications interface 305 (e.g. a wireless interface such as a cellular wireless communications interface, and/or a wired interface such as through a cable modem), memory 301, and/or storage 304 (such as a hard disk drive, tape system, or the like). The communications interface 305 may, in an illustrative embodiment, include two or more wired and/or wireless interfaces each configured to communicate over a different communication link. Software 302 may be stored within the memory 301 and/or the storage 304 that provides instructions to the processor 303 for enabling the resource controller 102 to perform various functions, such as to process file transfer requests (such as for image files) and store files in the storage 304. Although illustratively shown as part of the resource controller 102, the storage 304 may be remote storage coupled to the resource controller 102, such as an external drive or another storage device in communication with the resource controller 102. A display 306 may further be coupled to the processor 303 for allowing a user to interface with the resource controller 102 and/or view file and/or other data utilized by the resource controller 102. The display 306 may be integrated with the resource controller 102 or may be separate from it.

The resource controller 102 and/or its related storage 304 may store a variety of files, such as image files. The files may be organized and partitioned from other files in partitioned virtual areas, such as by the use of electronic virtual folders. Where the files are images, they may be partitioned by being organized, for example, in electronic photo albums. Each partitioned area, file, and/or user ID may have associated accessibility data that indicates the accessibility level of that partitioned area and/or file. The level of accessibility of a particular partitioned area may control which users may access the files in that partitioned area and/or what type of file and/or directory access may be provided to the user (e.g., write access, read access, and/or access to directory listings). For example, a first electronic photo album may be accessible only to a specified first user, and a second electronic photo album may be accessible only to the first user and to a specified second user, wherein the first user may modify the first and second photo albums but the second user may only view the second photo album.

To reduce unauthorized access, each file, partitioned area, and/or group of partitioned areas may be protected by one or more security measures, such as requiring the user requesting access to provide a correct user ID and/or password (e.g., an alphanumeric password, a personal identification number, or the like). For example, only a user who identifies himself or herself as user ID "steven" and provides a password of "hjuuirtd" may be provided access to a particular folder. If the correct user ID and password were provided to the resource controller 102, then that user would be able to add files, remove files, modify files, and/or view files in the folder, in a manner consistent with the level of accessibility associated with that folder. The resource controller 102 and/or and associated device may thus maintain association data that provides an association between user IDs, passwords, files, accessibility data, and/or partitions of files. This association may be stored in storage 304 and/or in any other storage, and may be in the form of a table, database, or the like. An example of such a table 401 is shown in FIG. 4. Alternatively, all files may be accessible to any user that is known by the resource controller 102, such as those listed in table 401.

The user ID and password may be provided to the resource controller 102 via a user interface coupled to the resource controller 102, via the user's mobile device 101, and/or by any other means. For instance, the user may wish to gain access to certain files by entering the appropriate user ID and password via the user interface 207 of the mobile device 101. Data representing the entered user ID and password may be provided, via the communications interfaces 202 and 305, to the resource controller 102.

It is likely that the user may either forget his or her user ID and/or password, or the user may simply not want the burden of remembering the user ID and/or password. In either case, identification information associated with the user's mobile device 101 may be used instead of the user ID and/or password. The identification information would thus be sent to the resource controller 102 instead of or in addition to the user ID and/or the password. The identification information may be any information that uniquely or nearly uniquely identifies the particular mobile device 101 and distinguishes it from other mobile devices 101. For example, where the mobile device 101 includes a cellular phone, the identification information may be the telephone number of the cellular phone, and the telephone number may be sent by the cellular telephone network as standard caller ID information. Based on the identification information, the software 302 of the resource controller 102 may process or reject a request from the mobile device 101 to view, modify, transfer, or write a file.

To process mobile device identification information, the resource controller 102 may associate known identification information with user IDs, passwords, files, and/or partitions of files. For example, table 401 shows a plurality of mobile device telephone numbers, each associated with respective user IDs and/or passwords. In this example, the telephone numbers are further associated with accessible folders. The table 401 may be a single table, database, etc., or a plurality of separate tables, databases, etc. that may be interlinked.

The mobile device 101 may further be used as a remote control device for manipulating files stored on resource controller 102 and/or storage 304, changing settings of the software 302, and/or for taking other such actions. Communication between the mobile device 101 as a remote control and the resource controller 102 may be made via SMS messaging and/or other types of messaging. Further, such communication may be accomplished via wireless communication or direct communication with resource controller 102, such as via the USB cable 103.

Figure 5:
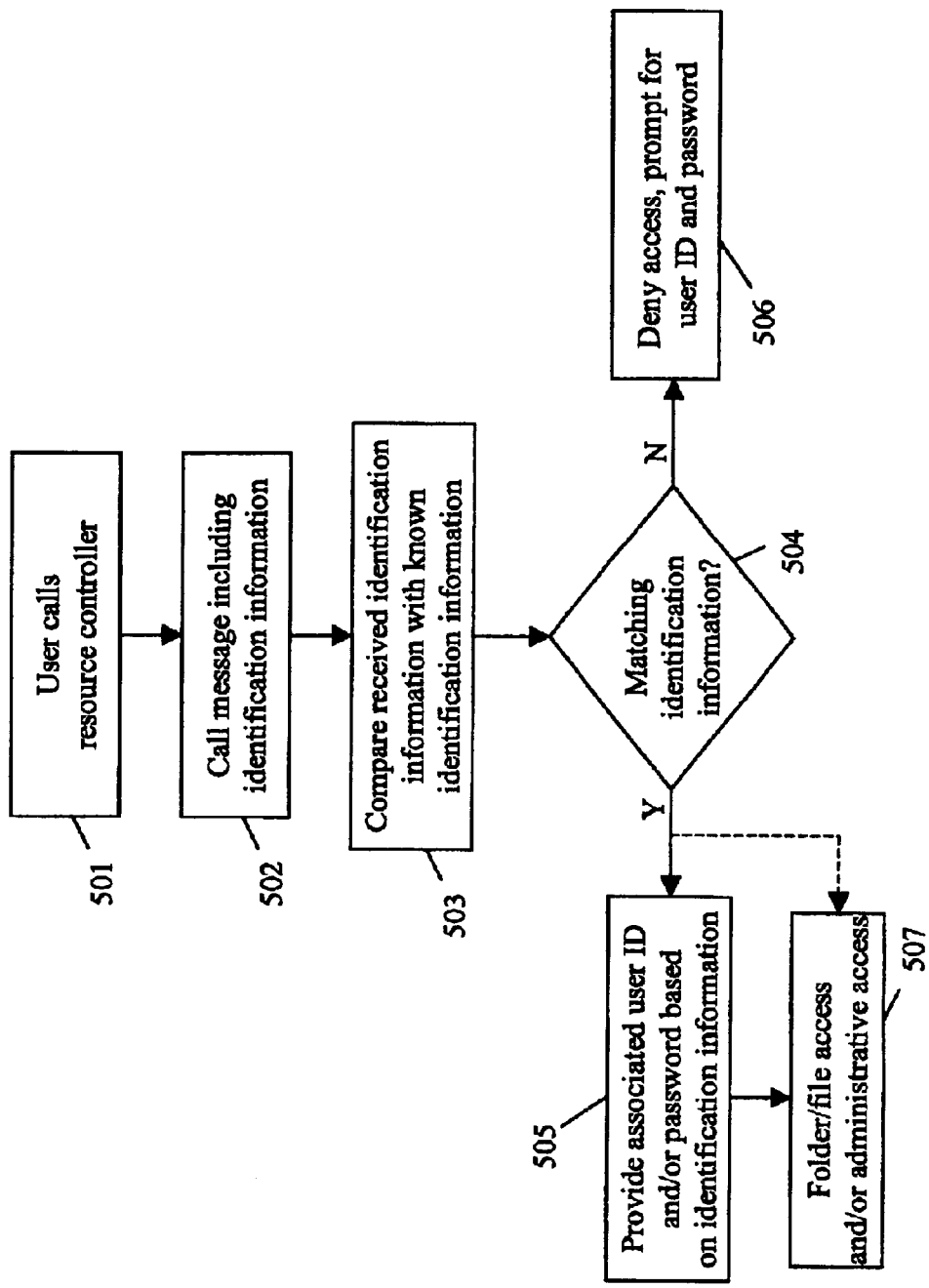
FIGS. 5 and 6 are flow charts showing illustrative steps of methods in accordance with at least one aspect of the present invention.

An example of how identification information may be utilized is now described with reference to FIG. 5. A user with a mobile device (e.g., the mobile device 101) such as a cellular phone may call or otherwise contact 501 a telephone number associated with a resource controller (e.g., the resource controller 102). Calling this telephone number may cause a connection to be made between the cellular phone and the resource controller via a first communication link such as a mobile network and/or the home network of the resource controller (e.g., the mobile network 104 and/or the home network 109). Alternatively, where the user's mobile device is within range of the resource controller, the user's mobile device may communicate with the resource controller via a short-range wireless system such as BLUETOOTH, by infrared communications, by wire (e.g., using a USB connection), or the like. When the call to the resource controller's telephone number is made, identification information may be automatically and/or manually sent 502 across the first communication link to the resource controller. In the present example, standard caller ID information may be sent to the resource controller, identifying the telephone number or other identifying attribute of the user's mobile device. For example, the caller ID information may include "202-123-4567" and/or a name of the caller such as "Steve." However, the identification information is not limited to caller ID information and may be any type of information that identifies the particular mobile device sending the identification information.

In one illustrative embodiment, since SMS messages include text, the identification information and/or other information may be included in one or more SMS messages. For example, the software 204 in the mobile device 101 may be programmed such that the phone number or other identification information (e.g. MAC address, user name, password, etc.) may be included in the SMS message. The SMS message would be sent to the SMSC 105, and in response the SMSC 105 would send the identification information to the resource controller 102. The resource controller 102 may also send messages to the mobile device 101 via the SMSC 105.

Next, the resource computer (e.g., using software 302) may compare 503 the received identification information with stored association data, such as stored identification information (e.g., stored in storage 304). The resource controller may be configured to, for instance, respond to file transfer requests from a pre-determined group of telephone numbers, such as a family of cellular phones or other mobile devices. In the present example, the identification information "202-123-4567" matches one of the entries in the association table 401. If there is a match 504, then the software may provide the user ID and/or password (in this example, "steven" and "hjuuirtd") to the portion of the resource controller that controls access to folders. According to this particular table 401, the accessibility data is "F1," meaning that this user has full access (including read and write access) to Folder 1. In association with user "martinn," the accessibility data in table 401 is "R2," meaning that this user has read-only access to Folder 2. As can also be seen from table 401, user "lucyn" has read-only access to Folders 1 and 4, and full access to Folder 3. Thus, the resource controller provides access 507 to the designated folder(s) and/or file(s) based on the identification information sent from the mobile device. As an alternative to providing a user ID and/or password based on the identification information, the software of the resource controller may skip this step (as shown by the dashed arrow) and directly associate the identification information with the accessible folder(s) and/or file(s). Although table 401 shows the accessibility data as being in the illustrative format of, e.g., "F1," the accessibility data may be in any format.

If no match is found 504 between the received identification information and stored identification information, then the resource controller may deny 506 file/folder access and/or send a message to the mobile device, alerting the mobile device that access is denied. In response, the mobile device may alert the user (e.g., via the display 205) that access has been denied. The mobile device may further prompt the user to manually enter a user ID, password, and/or other identification information. An opportunity for manual entry of such information may be useful where the user is attempting to gain file/folder access using another user's mobile device.

Once access is provided, files may be transferred between the mobile device 101 and the resource controller 102 over a second communication link that may be the same or different from the first communication link. For instance, files that are stored in storage 304 may be obtained and sent to the mobile device 101, and files may be downloaded from the mobile device 101 to the resource controller 102 and ultimately to storage 304. Such file transfers over the second communication link may be made via any wireless or wired connection (e.g., via the mobile network 104, the home network 109, a BLUETOOTH wireless connection, and/or any other means). In one illustrative embodiment, files may be transferred to the resource controller 102 using MMS messaging via the MMSC 106.

Figure 6:
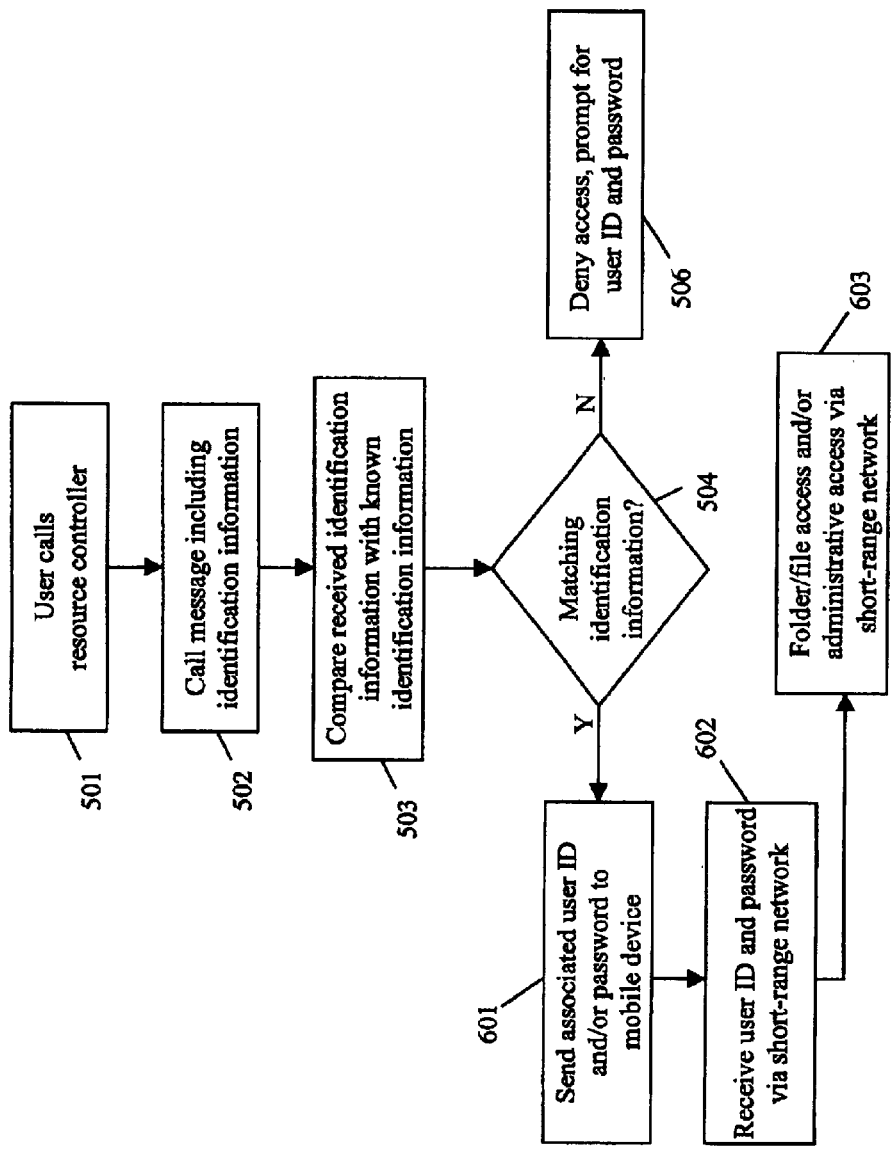

Referring to FIG. 6, the identification information may be received from the mobile device 101 via the first communication link, such as the mobile network 104. If a match between the identification information and the stored identification information is determined at step 504, the resource controller 102 may alternatively send 601 the appropriate associated user ID and/or password (and/or other information required to access the appropriate files) to the mobile device 101. The user may then enter the user ID and/or password into the mobile device 101 or another mobile device and send 602 the user ID and/or password (and/or other information) to the resource controller 102 via a second network such as the home network 109 and/or another connection such as the USB cable 103. Upon receipt of the correct user ID and/or password (and/or other information), the resource computer may grant the user and mobile device access to the appropriate files over the second communication link. Such access may be provided over the second network and/or over another connection such as the USB cable 103.

Figure 7:
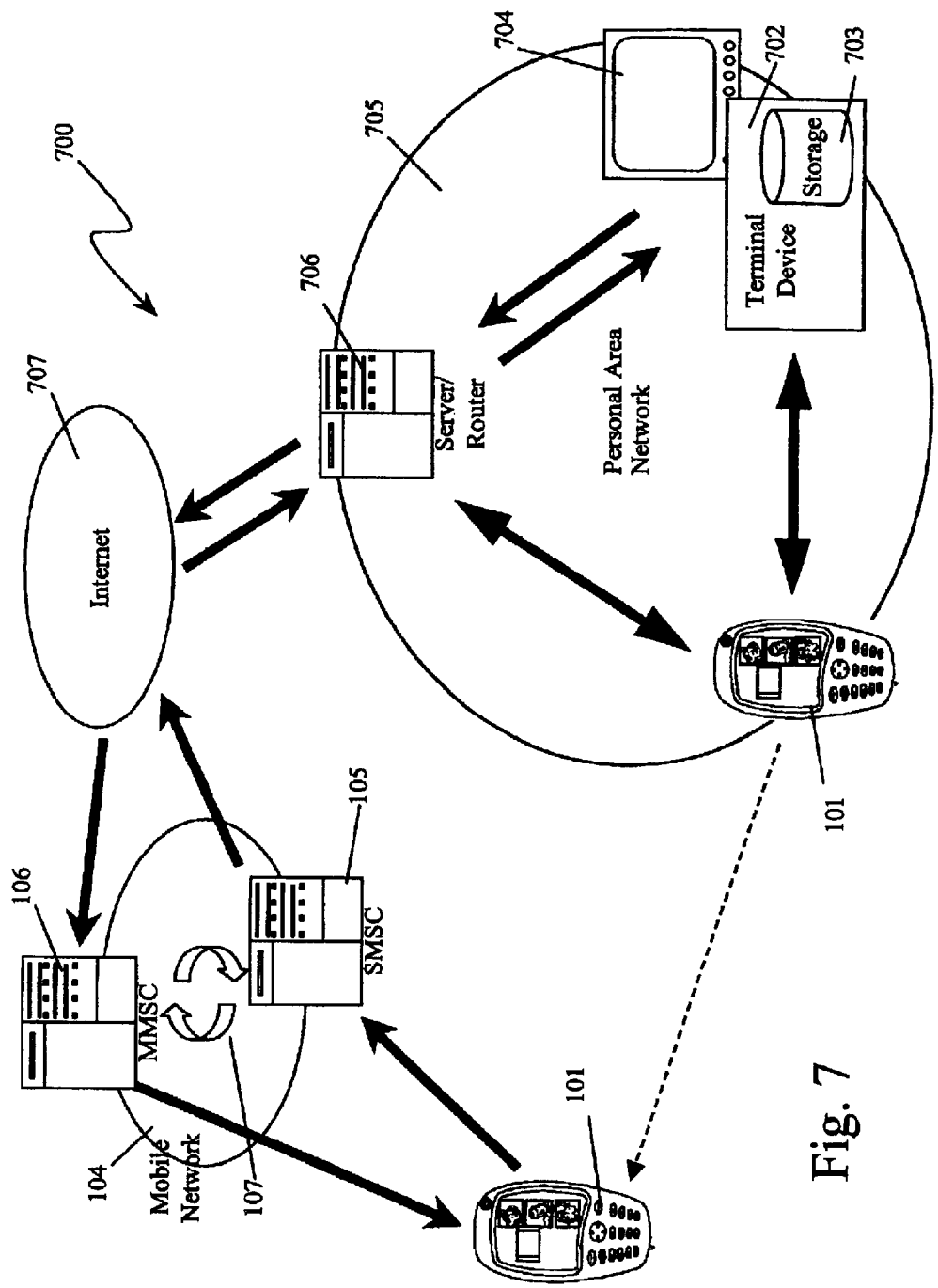
FIG. 7 is a functional block diagram of another illustrative embodiment of a mobile communications environment in accordance with at least one aspect of the present invention.

Referring now to FIG. 7, another illustrative embodiment of a wireless communication system 700 is shown that supports the various aspects of the invention disclosed above, including providing limited access to files and/or file partitions based on identification information from the mobile device 101. The wireless communication system 700 is generally similar to the wireless communication system 100, and includes a personal area network 705 coupled to the mobile network 104. In this embodiment, SMS and MMS messaging communication paths may include communications via the Internet 707. The personal area network 705 may include a server/router 706 (which may act as a server or router for the personal area network 705), a terminal device 702, and/or one or more of the network-enabled mobile devices 101, which may each be coupled to one another via wireless communications, such as using BLUETOOTH, and/or via wired communications.

The terminal device 702 may correspond to the resource controller 102, and may function as a repository for files (such as in storage 703). The mobile device 101 and the terminal device 702 may transfer files between each other, either wirelessly or wired. The terminal device 702 may be, e.g., a digital broadcast receiver in communication with a display device, such as a display 704 (e.g., a television). The terminal device 702 may include software for transferring files to and from the mobile device 101 as requested in accordance with the present invention, as well as for displaying files on the display 704. As such, the user may manage, store, and/or view files using the terminal device 702. When the mobile device 101 is located within the personal area network 705, the mobile device 101 may browse and view files (assuming access to those files is provided) stored on the terminal device 702 via communications within the personal area network 705. As the mobile device 101 moves outside of the personal area network 705, the mobile device 101 may access files stored at the terminal device 702 and/or at the server/router 706 in accordance with the present invention described herein.

While exemplary systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims, however these claims are exemplary in that the invention is intended to include the elements and steps described herein in any combination or sub combination. It will also be appreciated and understood that modifications may be made without departing from the true spirit and scope of the invention. For example, the present invention applies to almost any type of network, computer, and mobile device, and to a variety of different communication protocols and systems.

I claim:

1. A method for providing access to files, comprising:
    receiving caller ID information from a mobile device over a first communication link; and
    determining whether a file may be at least partially accessed by the mobile device over a second communication link based on the caller ID information.

2. The method of claim 1, further including the step of transferring at least part of the file to the mobile device if the file may be accessed.

3. The method of claim 2, wherein the file includes an image.

4. The method of claim 1, further including maintaining association data that associates identification information with access rights of at least one user, the step of determining including determining based on a comparison of the association data and the caller ID information.

5. The method of claim 4, wherein the association data comprises user ID information, password information, caller ID information, and accessibility information.

6. The method of claim 1, wherein the first communication link is established via a cellular telephone network.

7. The method of claim 1, wherein the second communication link is a short-range wireless communication link.

8. The method of claim 7, wherein the short-range wireless communication link is a BLUETOOTH link.

9. A method for providing access to files, comprising:
    receiving information identifying a mobile device over a first network;
    based on the information identifying the mobile device, providing the mobile device a password over the first network;
    receiving the password over a second network; and
    providing access to files based on the password.

10. The method of claim 9, wherein the first network comprises a cellular telephone network.

11. The method of claim 9, wherein the second network comprises a short-range wireless network.

12. The method of claim 11, wherein the second network comprises a BLUETOOTH network.

13. The method of claim 9, wherein the mobile device comprises a cellular telephone and the information identifying the mobile device comprises caller ID information for the cellular telephone.

14. An apparatus, comprising:
a first wireless interface configured to communicate with a mobile device over a first wireless communication link;
a second wireless interface configured to communicate with the mobile device over a second wireless communication link;
a storage device storing association data that associates access rights with corresponding identification information; and
a processor coupled to the first and second wireless interfaces and the storage device and configured to receive from the first wireless interface information identifying the mobile device, compare the received information identifying the mobile device with the stored association data, and provide access to at least part of a file via the second wireless interface.

15. The apparatus of claim 14, wherein the first wireless communication link is a cellular telephone link and the second wireless communication link is a short-range wireless link.

16. The apparatus of claim 15, wherein the short-range wireless link is a BLUETOOTH link.

17. The apparatus of claim 15, wherein the processor is further configured to provide access to the at least part of the file via the second wireless interface based on a comparison of the received information identifying the mobile device and the stored association data.

18. The apparatus of claim 15, wherein the file includes an image.

19. A system, comprising:
a mobile device configured to communicate over first and second communication links, and to send identification information over the first communication link;
a resource controller configured to communicate with the mobile device over the first and second communication links;
a storage device storing association data that associates access rights with corresponding identification information; and
means for determining whether the mobile device has access to at least part of a file based on the association data and the identification information and the identification information,
the resource controller further configured to provide the at least part of the file to the mobile device over the second communication link.

20. The system of claim 19, wherein the first communication link includes a cellular telephone network and the second communication link includes a short-range wireless link.

21. The system of claim 20, wherein the short-range wireless link is a BLUETOOTH link.

* * * * *